(12) United States Patent
Scholz et al.

(10) Patent No.: US 7,563,839 B2
(45) Date of Patent: *Jul. 21, 2009

(54) SILICONE RUBBER MIXTURES

(75) Inventors: Mario Scholz, Gründau (DE); Jürgen Meyer, Stockstadt (DE)

(73) Assignee: Degussa AG, Düsseldorf (DE)

( * ) Notice: Subject to any disclaimer, the term of this patent is extended or adjusted under 35 U.S.C. 154(b) by 468 days.

This patent is subject to a terminal disclaimer.

(21) Appl. No.: 11/050,198

(22) Filed: Feb. 3, 2005

(65) Prior Publication Data

US 2005/0171268 A1     Aug. 4, 2005

(30) Foreign Application Priority Data

Feb. 3, 2004   (DE) .................. 10 2004 005 155

(51) Int. Cl.
*C08K 9/06*   (2006.01)

(52) U.S. Cl. .................. 524/424; 524/588; 523/212

(58) Field of Classification Search .............. 524/424, 524/588; 523/212
See application file for complete search history.

(56) References Cited

U.S. PATENT DOCUMENTS

| | | | | |
|---|---|---|---|---|
| 5,959,005 | A | * | 9/1999 | Hartmann et al. ............ 523/213 |
| 6,013,201 | A | * | 1/2000 | Hayashida et al. .......... 252/511 |
| 6,331,588 | B1 | | 12/2001 | Azechi et al. |
| 6,800,413 | B2 | * | 10/2004 | Barthel et al. ............ 430/108.3 |

FOREIGN PATENT DOCUMENTS

| | | |
|---|---|---|
| DE | 1 163 784 | 2/1964 |
| DE | 199 43 666 A1 | 3/2001 |

* cited by examiner

*Primary Examiner*—Margaret G Moore
(74) *Attorney, Agent, or Firm*—Robert G. Weilacher; Smith, Gambrell & Russell

(57) ABSTRACT

Silicone rubber mixtures containing structure-modified hydrophobic pyrogenic silica.

8 Claims, No Drawings

SILICONE RUBBER MIXTURES

INTRODUCTION AND BACKGROUND

The present invention relates to silicone rubber mixtures, to a process for their preparation and to their use.

It is known to use pyrogenic silica that has been rendered hydrophobic as a filler in silicone rubber mixtures (DE 199 43 666 A1).

U.S. Pat. No. 6,331,588 describes LSR silicone rubber mixtures containing pyrogenic silicas as filler. In order to avoid the undesirable effect of the silanol groups on the mechanical properties of the silicone rubber, it is necessary according to U.S. Pat. No. 6,331,588 to render the surface of the pyrogenic silica hydrophobic.

According to the prior art, in the case of LSR (liquid silicone rubber), either a hydrophilic silica is rendered hydrophobic in situ and at the same time exposed to very high shear forces so that the viscosity and the yield point can be lowered, or a silica that has already been rendered hydrophobic is exposed to high shear forces for the same reason.

SUMMARY OF THE INVENTION

The invention provides silicone rubber mixtures which are characterised in that they contain a structure-modified hydrophobic pyrogenic silica as filler.

If this structure-modified, pyrogenic silicon dioxide that has been rendered hydrophobic is incorporated into silicone rubber mixtures, wholly novel properties of the silicone rubber mixtures are obtained.

DETAILED DESCRIPTION OF INVENTION

As the structure-modified, pyrogenic silica there may be used silanized structure-modified pyrogenically prepared silicas which are characterized by groups fixed to their surface, the groups being dimethylsilyl and/or monomethylsilyl, preferably dimethylsilyl.

In a preferred embodiment of the invention, the silicas may have the following physico-chemical characteristic data:

| | |
|---|---|
| BET surface area m²/g: | 25-400 |
| mean primary particle size nm: | 5-50 |
| pH value: | 3-10 |
| carbon content %: | 0.1-10 |
| DBP number %: | <200 |

The silica used in accordance with the invention may have a tamped density of from 100 to 280 g/l, preferably from 100 to 240 g/l.

Pyrogenic silicas are known from Winnacker-Küchler Chemische Technologie, Volume 3 (1983), 4th Edition, page 77 and Ullmanns Enzyklopädie der technischen Chemie, 4th Edition (1982), Volume 21, page 462.

Pyrogenic silicas are prepared in particular by flame hydrolysis of vaporizable silicon compounds, such as, for example, $SiCl_4$, or organic silicon compounds, such as trichloromethylsilane.

The silanized, structure-modified, pyrogenically prepared silicas can be prepared by treating pyrogenically prepared silica in a known manner with dimethylchlorosilane and/or monomethyltrichlorosilane, the groups dimethylsilyl and/or monomethylsilyl being fixed to the surface of the pyrogenic silica, followed by structure modification and, optionally, milling.

In an embodiment, tempering may be carried out after the structure modification and/or milling.

The silicas used in accordance with the invention can be prepared, for example, as follows:

The silicas, which can be prepared as described in DE 1 163 784, are subsequently structure modified by mechanical action and optionally milled in a mill. Tempering may optionally be carried out after the structure modification and/or milling.

The structure modification can be carried out, for example, using a ball mill or a continuously operating ball mill. Milling can be carried out, for example, by means of an air-jet mill or pinned disk mill. Tempering can be carried out batchwise, for example in a drying cabinet, or continuously, for example in a fixed or fluidized bed. Tempering can be carried out under a protecting gas, for example nitrogen.

As a result of the structure modification, the morphology of the pyrogenic silicon dioxide is changed so that a lower degree of intergrowth and accordingly a lower structure result.

Silicone rubber can be understood as meaning both organopolysiloxanes and hydrogen siloxanes.

The term organopolysiloxanes within the scope of the invention includes all polysiloxanes hitherto used in crosslinkable organopolysiloxane compositions. organopoly-siloxanes are preferably a siloxane composed of units of the general formula (I)

$$(R^1)_a(R^2)_b SiO_{(4-a-b)/2} \qquad (I)$$

in which
R¹ represents a monovalent aliphatic radical having from 1 to 8 carbon atoms and
R² represents an alkenyl radical having from 2 to 8 carbon atoms,
a=0, 1, 2 or 3
b=0, 1 or 2
and the sum of a+b=0, 1, 2 or 3
with the proviso that, on average, at least two radicals R² are present per molecule. The organopolysiloxane is preferably stopped with dimethylvinylsiloxy end groups.

In an embodiment of the invention, the organopolysiloxanes according to the invention have viscosities of from 0.01 to 200 Pas, very particularly preferably from 0.2 to 200 Pas. The viscosities are determined in accordance with DIN 53 019 at 20° C. As a result of the preparation, in the case of branched polymers in particular, which may also be solid resins dissolved in solvents, up to a maximum of 10 mol. % of all the Si atoms may contain alkoxy or OH groups.

Hydrogen siloxanes are preferably linear, cyclic or branched organopolysiloxanes composed of units of the general formula (II)

$$(R^1)_c(H)_d SiO_{(4-c-d)/2} \qquad (II)$$

in which
R¹=monovalent aliphatic radical having from 1 to 8 carbon atoms,
c=0, 1, 2 or 3,
d=0, 1 or 2,
wherein the sum of c+d=0, 1, 2, or 3,
with the proviso that, on average, at least two Si-bonded hydrogen atoms are present per molecule.

In a preferred embodiment of the invention, the silicone rubber mixtures may be LSR (liquid) silicone rubber mixtures.

For elastomer applications, polydimethylsiloxanes having molecular weights of from 400,000 to 600,000 can be used, which are prepared with the addition of regulators, such as hexamethyl- or divinyltetramethyl-disiloxane, and carry corresponding end groups. In order to improve the vulcanization behavior and also the tear-growth resistance, it is possible by adding vinylmethyldichlorosilane to the reaction mixture to incorporate small amounts (<1%) of vinyl groups into the main chain as substituents (VMQ).

In terms of molecular structure, liquid silicone rubber (LSR) virtually corresponds to HTV, but its mean molecule chain length is lower by a factor of 6 and accordingly its viscosity is lower by a factor of 1000 (20-40 Pas). The processor is provided with two components (A and B) in equal amounts, which components already contain the fillers, vulcanizing agents and, optionally, other additives.

Reinforcing and non-reinforcing fillers can be used as fillers.

Non-reinforcing fillers are characterized by extremely weak interactions with the silicone polymer. They include chalk, quartz flour, diatomaceous earth, mica, kaolin, $Al(OH)_3$ and $Fe_2O_3$. The particle diameters are of the order of magnitude of 0.1 µm. Their purpose is to raise the viscosity of the compounds in the unvulcanized state and to increase the Shore hardness and the modulus of elasticity of the vulcanized rubbers. In the case of surface-treated fillers, improvements in tear strength can also be achieved.

Reinforcing fillers are especially highly dispersed silicas having a surface area of >125 $m^2/g$. The reinforcing action is attributable to the bond between the filler and the silicone polymer. Such bonds are formed between the silanol groups at the surface of the silicas (3-4.5 SIOH groups/$nm^2$) and the silanol groups of the a-ω dihydroxypolydimethylsiloxanes via hydrogen bridge bonds to the oxygen of the siloxane chain. These filler/polymer interactions result in increases in viscosity and changes in the glass transition temperature and in the crystallization behavior. On the other hand, polymer/filler bonds bring about an improvement in the mechanical properties but can also result in crepe hardening of the rubbers.

Talcum occupies a middle position between reinforcing and non-reinforcing fillers. Fillers are additionally used for special effects. These include iron oxide, zirconium oxide or barium zirconate for increasing the heat stability.

The silicone rubber mixtures according to the invention can contain as further constituents catalysts, crosslinkers, coloring pigments, antiadhesives, plasticisers and adhesion promoters.

Plasticizers can be used to establish a low modulus of elasticity. Internal adhesion promoters can be used. Internal adhesion promoters are based on functional silanes which are able to interact on the one hand with the substrate and on the other hand with the silicone polymer to be crosslinked (use principally in RTV-1 rubbers).

Low molecular weight or monomeric silanol-rich compounds (e.g. diphenylsilanediol, $H_2O$) counteract crepe hardening. They prevent strong interaction of the silicone polymers with the silanol groups of the filler by reacting more rapidly with the filler. A corresponding effect can also be achieved by partially coating the filler with trimethylsilyl groups (treatment of the filler with methylsilanes).

It is also possible to modify the siloxane polymer chemically (phenyl polymers, boron-containing polymers) or to blend it with organic polymers (butadiene-styrene copolymers).

Because of the low viscosity of the starting polymer, particularly intensive incorporation and mixing in specially developed mixing units are required in order to achieve homogeneous distribution. In order to facilitate the taking up of the filler and to avoid crepe hardening, the silica is rendered completely hydrophobic—in most cases in situ during the mixing operation and by means of hexamethyldisilazane (HMDS, also HMDZ).

The vulcanization of LSR mixtures is carried out by hydrosilylation, i.e. by addition of methyl hydrogen siloxanes (having at least 3 SiH groups in the molecule) to the vinyl group of the polymer with catalysis using ppm amounts of Pt(O) complexes, the crosslinker and the catalyst being located in the separate components when supplied. Specific inhibitors, e.g. 1-ethynyl-1-cyclohexanol, prevent the premature start of vulcanization after the components have been mixed and establish a dropping time of about 3 days at room temperature. With regard to the platinum and inhibitor concentration, the ratios can be adjusted in a considerable range.

LSR mixtures are increasingly being used in the manufacture of electrically conductive silicone rubber products because addition crosslinking, unlike peroxide vulcanization, which is conventional in the case of HTV, is not affected by furnace blacks (acetylene black is preferably used in HTV mixtures). Conductive furnace blacks are also easier to mix in and distribute than graphite or metal powders, preference being given to silver.

The silicone rubber mixtures according to the invention have the following advantages:

Tests in LSR (liquid silicone rubber) show that the structure-modified hydrophobic oxides of Examples 1 to 4 according to the invention exhibit markedly lower viscosities and, with one exception, also markedly lower yield points in the liquid silicone compared with the hydrophobic starting materials (pyrogenic silicas). The markedly lower yield points in particular are advantageous because very good flow behavior is desirable when processing liquid silicone rubber.

By means of the structure-modified oxides it is possible according to the invention to use materials which, on account of their low structure, already have extremely low viscosities and yield points and accordingly must not be exposed to high shear forces during preparation. An advantage for the user is the cost saving in terms of energy, time and materials.

EXAMPLES

Preparation and Physico-Chemical Properties of the Silicas

Preparation of the comparative silicas: The comparative silicas 1, 2 and 3 are prepared in the manner described in DE 1 163 784.

Preparation of the silicas that can be used in accordance with the invention:

The silicas, which are prepared in the manner described in DE 1 163 784, are subsequently structure modified by mechanical action and then optionally milled in a mill. Tempering may optionally be carried out after the structure modification and/or milling.

The structure modification can be carried out, for example, using a ball mill or a continuously operating ball mill. Milling can be carried out, for example, by means of an air-jet mill or pinned disk mill. Tempering can be carried out batchwise, for example in a drying cabinet, or continuously, for example in a fixed or fluidised bed. Tempering can be carried out under a protecting gas, for example nitrogen.

TABLE 1

Overview of the preparation of the comparative silicas and of the silicas that can be used in accordance with the invention (Examples)

| Name | Group fixed to the surface | Structure modification | Milling after structure modification | Tempering after milling |
|---|---|---|---|---|
| Comparative silica 1 | Dimethylsilyl | No | — | — |
| Comparative silica 2 | Dimethylsilyl | No | — | — |
| Comparative silica 3 | Dimethylsilyl | No | — | — |
| Silica 1 | Dimethylsilyl | Yes | No | No |
| Silica 2 | Dimethylsilyl | Yes | No | No |
| Silica 3 | Dimethylsilyl | Yes | No | No |
| Silica 4 | Dimethylsilyl | Yes | No | No |
| Silica 5 | Dimethylsilyl | Yes | Yes | No |
| Silica 6 | Dimethylsilyl | Yes | No | No |
| Silica 7 | Dimethylsilyl | Yes | Yes | No |
| Silica 8 | Dimethylsilyl | Yes | Yes | Yes |
| Silica 9 | Dimethylsilyl | Yes | Yes | Yes |
| Silica 10 | Dimethylsilyl | Yes | Yes | No |
| Silica 11 | Dimethylsilyl | Yes | Yes | No |
| Silica 12 | Dimethylsilyl | Yes | Yes | No |
| Silica 13 | Dimethylsilyl | Yes | Yes | No |

Testing of the Structure-Modified Pyrogenic Silicas in a Silicone Rubber Mixture The products from Table 3 are tested in a LSR silicone formulation. The hydrophobic starting materials used for the structure modification are used as the comparative material.

LSR Silicone Rubber Mixture

In a planetary dissolver, 20% silica is incorporated at low speed (50/500 min$^{-1}$ planetary mixer/dissolver plate) into organopolysiloxane (Silopren U 10 GEBayer) and then dispersed for 30 minutes at high speed (100/2000 min$^{-1}$). The rheological properties are then determined by means of a rheometer (Haake).

The structure-modified products (Examples 1 to 4 according to the invention) exhibit markedly lower Theological properties (Table 4) compared with the hydrophobic starting materials (Examples 5 to 8). The viscosity falls by up to 80% of the original value of the starting material. The starting material for Example 4 (see Example 8) can no longer even be incorporated in this concentration into the organopolysiloxane mixture on account of the excessive thickening action.

TABLE 2

Physico-chemical data of the silicas that can be used in accordance with the invention (Examples) and of the comparative silicas

| Name | Tamped density [g/l] | Loss on drying [%] | Ignition loss [%] | pH value | C content [%] | DBP adsorption [%] | Specific surface area according to BET [m$^2$/g] |
|---|---|---|---|---|---|---|---|
| Comparative silica 1 | 64 | 0.1 | 0.5 | 4.0 | 0.8 | 243 | 113 |
| Comparative silica 2 | 67 | 0.5 | 0.6 | 4.8 | 1.0 | 256 | 165 |
| Comparative silica 3 | 72 | 0.7 | 1.0 | 4.0 | 1.6 | 255 | 256 |
| Silica 1 | 236 | 0.1 | 0.6 | 4.0 | 0.8 | 127 | 115 |
| Silica 2 | 204 | 0.1 | 0.6 | 3.9 | 0.8 | 137 | 116 |
| Silica 3 | 223 | 0.3 | 0.7 | 4.2 | 1.0 | 160 | 169 |
| Silica 4 | 186 | 0.3 | 0.7 | 4.2 | 1.1 | 152 | 171 |
| Silica 5 | 109 | 0.2 | 0.7 | 4.4 | 1.1 | 159 | 167 |
| Silica 6 | 193 | 1.2 | 0.7 | 5.2 | 1.7 | 157 | 258 |
| Silica 7 | 125 | 0.2 | 0.7 | 4.1 | 0.8 | 130 | 110 |
| Silica 8 | 140 | 0.5 | 1.6 | 4.7 | 1.7 | 162 | 223 |
| Silica 9 | 123 | 0.3 | 0.5 | 4.3 | 1.1 | 157 | 165 |
| Silica 10 | 102 | 0.7 | 1.2 | 6.2 | 1.7 | 164 | 256 |
| Silica 11 | 160 | 0.2 | 0.7 | 4.0 | 0.8 | 132 | 115 |
| Silica 12 | 152 | 0.2 | 0.6 | 4.1 | 0.8 | 109 | 107 |
| Silica 13 | 219 | 0.6 | 1.0 | 4.9 | 1.3 | — | 129 |

TABLE 3

Analytical data of the structure-modified silicas

| Ex. | S | BET surface area [m$^2$/g] | pH value | Ignition loss [%] | Tamped density [g/l] | DBP absorption [wt. %] | Loss on drying [%] |
|---|---|---|---|---|---|---|---|
| Ex. 1 | S 13 | 129 | 5.2 | 1.0 | 27 | — | 0.6 |
| Ex. 2 | S 8 | 223 | 4.7 | 1.6 | 140 | 162 | 0.5 |
| Ex. 3 | S 10 | 256 | 6.2 | 1.2 | 102 | 164 | 0.7 |
| Ex. 4 | S 5 | 167 | 4.4 | 0.7 | 109 | 159 | 0.2 |

Explanation:
pH 4% sus. = pH value of the four percent aqueous suspension;
DBP = dibutyl phthalate absorption,
n.e. = device does not detect an end point.

TABLE 4

Rheological properties with 20% silica

| Silica | Yield point [Pa] | Viscosity D = 10 s$^{-1}$ |
|---|---|---|
| Example 1 | 138 | 77 |
| Example 2 | 573 | 147 |
| Example 3 | 1248 | 235 |
| Example 4 | 778 | 170 |
| Example 5 (comparison to Ex. 1) | 659 | 372 |
| Example 6 (comparison to Ex. 2) | 680 | 406 |

TABLE 4-continued

Rheological properties with 20% silica

| Silica | Yield point [Pa] | Viscosity $D = 10\ s^{-1}$ |
|---|---|---|
| Example 7 (comparison to Ex. 3) | 1125 | 446 |
| Example 8 (comparison to Ex. 4) | not measurable | not measurable |

Further modifications and variations will be apparent from the foregoing to those skilled in the art and are intended to be encompassed by the claims apopended hereto.

German prior application No. 10 2004 005 155.0 of Feb. 3, 2004, is relied on and incorporated herein by reference.

We claim:

1. A composition of matter comprising a silicone rubber, a structure-modified hydrophobic pyrogenic silica as filler, and a conductive furnace black,
    wherein the silica is a silanized, structure-modified, pyrogenically prepared silica with groups fixed to its surface, the groups being at least one of dimethylsilyl and monomethylsilyl;
    wherein the silicone rubber is a LSR silicone rubber mixture; and
    wherein the composition of matter is a vulcanized silicone rubber mixture.

2. The composition of matter according to claim 1, wherein the silica has been prepared pyrogenically in the manner of flame oxidation or flame hydrolysis and that is from 10 to 1000 m²/g, has been rendered hydrophobic and has been subjected to structure modification.

3. The composition of matter according to claim 1, wherein the silica is a silanized, structure-modified, pyrogenically prepared silica having the following physico-chemical characteristic data:

| | |
|---|---|
| BET surface area m²/g: | 25-400 |
| mean primary particle size nm: | 5-50 |
| pH value: | 3-10 |
| carbon content %: | 0.1-10 |
| DBP number %: | <200. |

4. A molded article comprising the silicone rubber composition according to claim 1.

5. A molded article comprising the silicone rubber composition according to claim 2.

6. A molded article comprising the silicone rubber composition according to claim 3.

7. The composition of matter according to claim 1, wherein the silica is structure modified by mechanical action and optionally milled in a mill.

8. Process for the preparation of a silicone rubber composition comprising incorporating a structure-modified hydrophobic pyrogenic silica as filler, and a conductive furnace black into silicone polymer and homogenizing
    wherein the silica is a silanized, structure-modified, pyrogenically prepared silica with groups fixed to its surface, the groups being at least one of dimethylsilyl and monomethylsilyl;
    wherein the silicone rubber is a LSR silicone rubber mixture; and
    vulcanizing the silicone rubber composition.

* * * * *